US007687999B2

(12) United States Patent
Essick et al.

(10) Patent No.: US 7,687,999 B2
(45) Date of Patent: Mar. 30, 2010

(54) EMERGENCY INDICATOR LIGHT FOR VEHICLE PENNANT

(76) Inventors: Dale Essick, 3466 State Highway W., Ozark, MO (US) 65721; Iris Essick, 3466 State Highway W., Ozark, MO (US) 65721

( * ) Notice: Subject to any disclaimer, the term of this patent is extended or adjusted under 35 U.S.C. 154(b) by 158 days.

(21) Appl. No.: 11/507,700

(22) Filed: Aug. 21, 2006

(65) Prior Publication Data
US 2007/0159113 A1 Jul. 12, 2007

Related U.S. Application Data

(60) Provisional application No. 60/756,770, filed on Jan. 6, 2006.

(51) Int. Cl.
*H05B 39/09* (2006.01)
(52) U.S. Cl. .................................. 315/200 A
(58) Field of Classification Search ................ 362/459, 362/461–463, 473, 84, 478, 800, 485, 543, 362/545, 183, 190, 191; 116/28 R, 28.1, 116/173, 175, 200, 202; 315/77–78, 80, 315/200 A, 209 R; 340/431–434, 463, 468, 340/479
See application file for complete search history.

(56) References Cited

U.S. PATENT DOCUMENTS 3,732,539 A * 5/1973 Easterly ...................... 340/466
5,388,546 A * 2/1995 Lombard ..................... 116/209
5,496,400 A * 3/1996 Doyle et al. ................. 106/220
5,598,065 A * 1/1997 Lakosky ....................... 315/77
5,770,999 A * 6/1998 Rhodes ......................... 340/468
6,021,862 A * 2/2000 Sharan ........................ 180/216
6,129,035 A * 10/2000 Schweinberger .......... 116/28 R
6,323,651 B2 * 11/2001 Melendez .................... 324/504
6,378,453 B1 * 4/2002 Conway .................... 116/28 R
6,558,018 B1 * 5/2003 Blum .......................... 362/183
7,218,214 B2 * 5/2007 Werner et al. ............... 340/468
7,266,431 B2 * 9/2007 Jackson .......................... 701/1
7,300,382 B2 * 11/2007 Yamamoto .................. 477/110
7,367,700 B2 * 5/2008 Chasmar ..................... 362/473
2006/0207493 A1 * 9/2006 Chasmar ..................... 116/173

* cited by examiner

Primary Examiner—Douglas W Owens
Assistant Examiner—Minh D A
(74) Attorney, Agent, or Firm—Charles R. Sutton

(57) ABSTRACT

A safety light for vehicles, particularly small recreational vehicles such as all terrain vehicles, which is one or more light strips entwining the whip which supports the vehicle's pennant or flag. This invention can normally show light in a color which matches the color of the recreational vehicle. When the vehicle operator applies the brakes, the light entwining the whip changes to red to warn that the vehicle is braking. When the vehicle is overturned, or at the operator's command in the event of another emergency, the lights entwining the whip can be made to oscillate rapidly back and forth between the red and the other color that is normally shown. In this way the vehicle displays a clear emergency signal.

3 Claims, 3 Drawing Sheets

EMERGENCY INDICATOR LIGHT FOR VEHICLE PENNANT

CROSS REFERENCE TO RELATED APPLICATIONS

This application incorporates provisional application No. 60/756,770 by this reference. Provisional application No. 60/756,770 was filed on Jan. 6, 2006. Applicant claims the benefit of the Jan. 6, 2006 filing date pursuant to 35 U.S.C. §119.

STATEMENT REGARDING FEDERALLY SPONSORED RESEARCH OR DEVELOPMENT

This invention has not been made using federally sponsored research or development. The inventor retains all rights.

BACKGROUND OF THE INVENTION

All terrain vehicles (ATV) such as the popular four wheeled personal craft known as quads (see FIG. 1, item 1) are required by the law in many jurisdictions to sport a pennant (2) at the end of a long whiplike flagpole, or whip (3). This is to make these vehicles more visible to other traffic and prevent accidents. Whips with a light at the top are already known to the art as a modification to enhance the visibility of the all terrain vehicles. Also known are whips with light strips wrapped around them that constantly show the same color. The problem with these inventions is that they do nothing to signal the status of the systems on the all terrain vehicle. They do not change colors to signal the application of brakes or other conditions of change.

BRIEF SUMMARY OF THE INVENTION

This invention solves the problems of the prior art by providing a safety light for vehicles, particularly small recreational vehicles such as all terrain vehicles, which is one or more light strips entwining the whip which supports the vehicle's pennant or flag and normally (but changeably) show light in a color which matches the color of the recreational vehicle. When the vehicle operator applies the brakes, the light entwining the whip changes to red to warn that the vehicle is braking. When the vehicle is overturned, or at the operator's command in the event of another emergency, the lights entwining the whip can be made to oscillate rapidly back and forth between red and the other color that is normally shown. In this way the vehicle displays a clear emergency signal. The light on the whip can also be made to signal that the vehicle is running in reverse. This safety improvement can be used with bicycles, boats, motorized wheelchairs, mining carts, or any other small vehicle used under conditions where a lighted safety pennant would provide safety benefits.

DETAILED DESCRIPTION OF THE INVENTION

Figure 1:
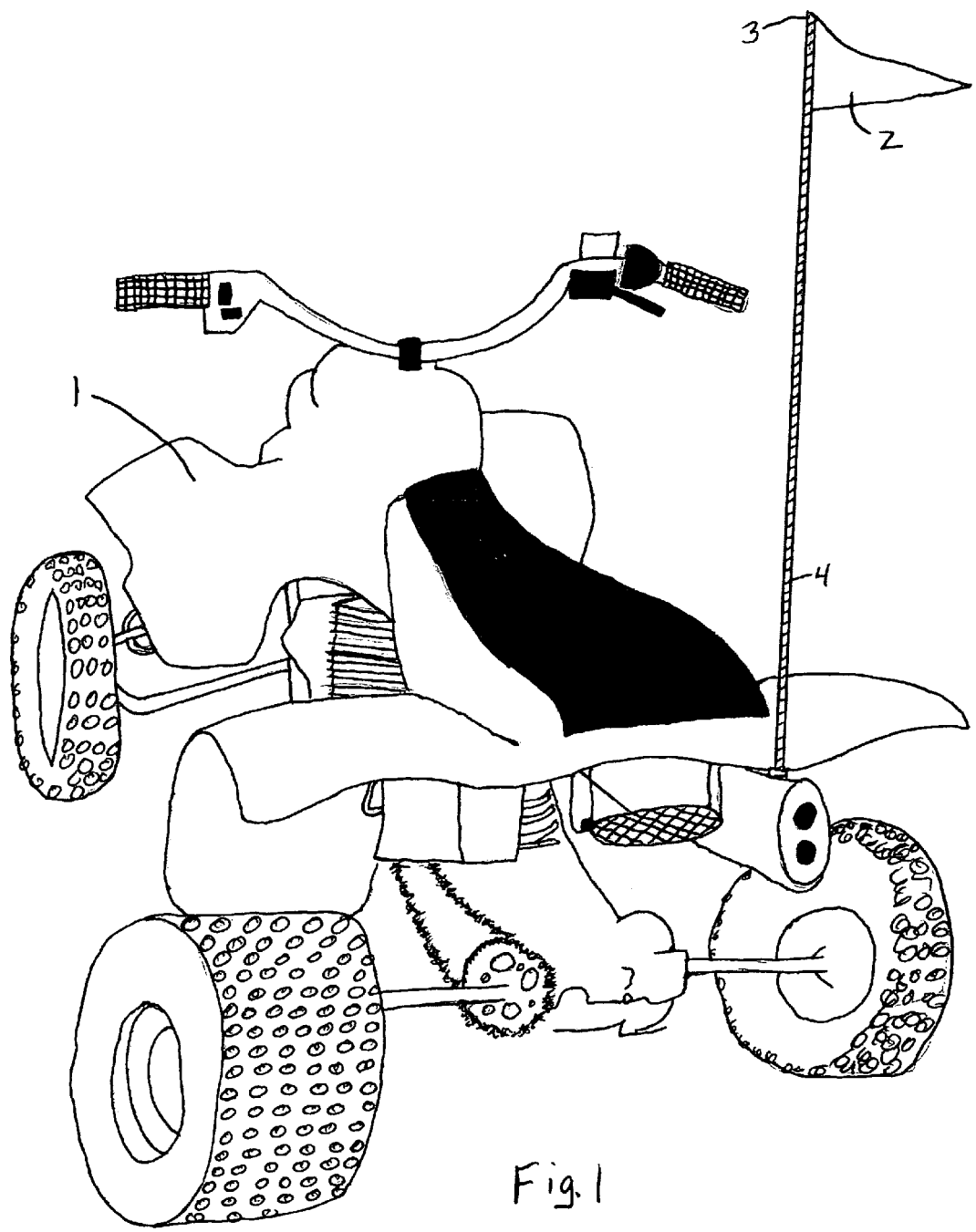
FIG. 1 shows a typical all terrain vehicle with a pennant on a whip and an entwined light strip thereon.
Figure 2:
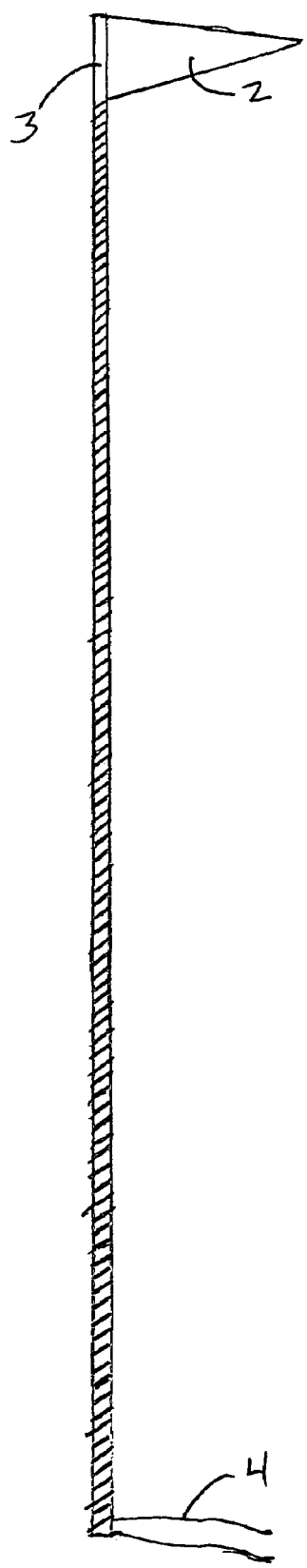
FIG. 2 shows only the pennant, whip, and light strip with its two leads exposed.
Figure 3:
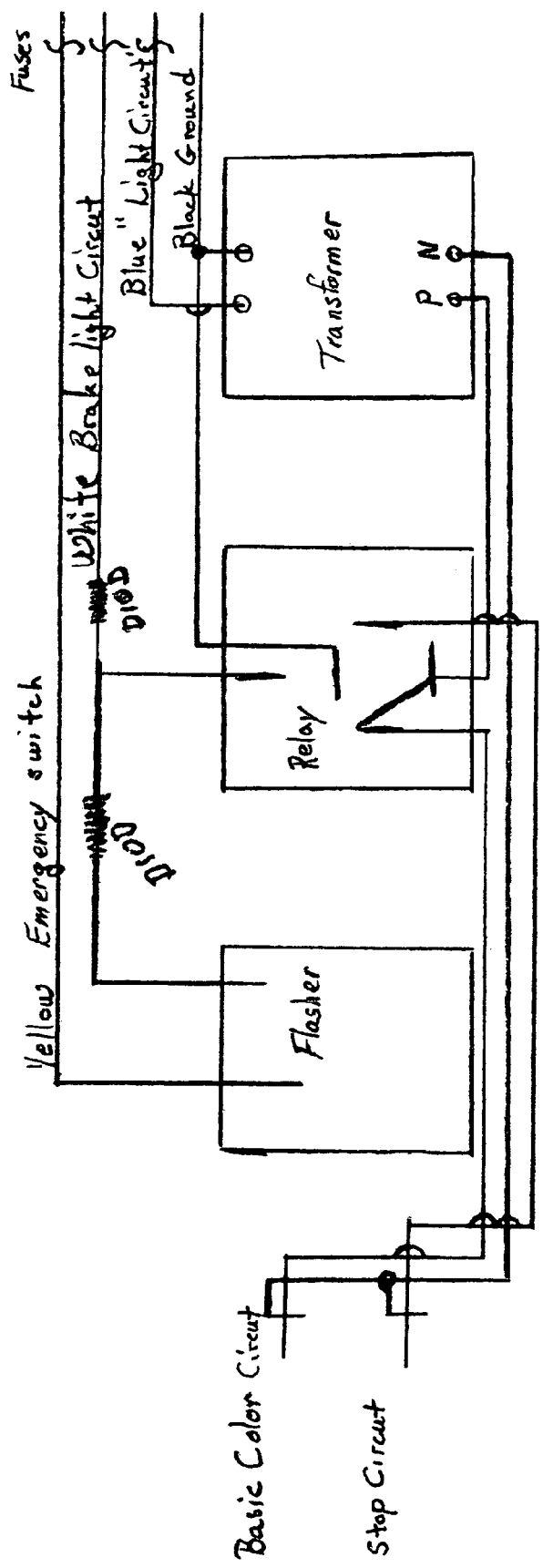
FIG. 3 shows a circuit diagram which will enable the lighting and switching functions of the invention to operate.

A safety light for vehicles, particularly small recreational vehicles such as all terrain vehicles, which is one or more light strips entwining the whip which supports the vehicle's pennant or flag. This invention can normally show light in a color which matches the color of the recreational vehicle. When the vehicle operator applies the brakes, the light entwining the whip changes to red to warn that the vehicle is braking. When the vehicle is overrturned, or at the operator's command in the event of another emergency, the lights entwining the whip can be made to oscillate rapidly back and forth between red and the other color that is normally shown. In this way the vehicle displays a clear emergency signal. The light on the whip can also be made to signal that the vehicle is running in reverse. This safety improvement can be used with bicycles, boats, motorized wheelchairs, mining carts, or any other small vehicle used under conditions where a lighted safety pennant would provide safety benefits. Referring now to FIG. 1, a typical ATV (1) is shown having a pennant (2) supported by a whip (3). Entwining the whip (3) is one or more light strips (4) which are the visible part of the invention. Referring now to FIG. 2, the light strips (4) can be seen to have leads (5) which go to an electronic circuit (seen at FIG. 3). Referring now to FIG. 3, a circuit diagram can be seen which will enable a person skilled in the pertinent art to construct a circuit that will operate the light strips shown as (4) in the prior drawings and operate them in the manner described herein. A transformer is used to alter the voltage and amperage of the electricity provided by the vehicle's battery, alternator, or generator so it is appropriate for a circuit driving light strips such as those used for typical similar lighted applications. A relay is present which switches the state of the circuit so that the lights either show the normal color, or alternatively show red when the vehicle is braking, or alternately flash in two different colors in emergency conditions. The flashing of the colors is accomplished by the Flasher. "Current diodes" can be used to prevent the electric current from back feeding. Of course, this basic circuit can also be used to change lights with other stimuli besides braking. The lights can be made to flash or show white when the vehicle is moving in reverse (if it has a reverse gear) in much the same way as the back up lights activate in an automobile. A switch is present to activate the emergency flashing mode. This can be a switch the operator can operate or it can alternatively be sensitive to vehicle overturns, such as a mercury switch. Finally, fuses are present to prevent damage to circuit components should there be a power surge or short circuit. The fuses are also useful to prevent fire if there is a short circuit or power surge.

We claim:

1. An indicator light for a mast on a vehicle comprising:

a light strip having at least one light and electronic leads, said light strip coiled around the exterior of said vehicle mast;

a control means having an electronic circuit, said electronic circuit having a flasher, a relay, a transformer, a brake light circuit, a basic color circuit, an emergency switch, current diodes and a stop circuit; wherein the current diodes are directly connected to the flasher and the relay to prevent the current from back feeding, said electronic leads cooperating with said electronic circuit; and said brake light circuit signals when brakes are applied on said vehicle, wherein said emergency switch operates said flasher when said vehicle is overturned causing alternate flashing between said basic color circuit and said brake light circuit.

2. The indicator light for a mast on a vehicle of claim 1 wherein said emergency switch is a mercury switch.

3. The indicator light for a mast on a vehicle of claim 1 wherein said relay alternately engages said light circuit and said basic color circuit.

* * * * *